March 22, 1966     N. A. BARYKIN ET AL     3,241,826

PNEUMATIC OR HYDRAULIC POWER ELEMENT

Filed Nov. 20, 1963

INVENTORS
N. A. BARYKIN
V. I. ZUBKIN
J. A. KONJKOV

BY *Glascock, Downing & Seebold*

ATTORNEYS

United States Patent Office 3,241,826
Patented Mar. 22, 1966

3,241,826
PNEUMATIC OR HYDRAULIC POWER ELEMENT
Nikolai Alexandrovich Barykin, Viktor Ivanovich Zubkin, and Jury Alexeevich Konjkov, all of Moscow, U.S.S.R., assignors to Nauchno-Issledoratelsky Institute Teploenergeticheskogo Priborosboenija
Filed Nov. 20, 1963, Ser. No. 324,933
3 Claims. (Cl. 267—1)

This invention relates to pneumatic or hydraulic devices used in power drives and various instruments.

It is known that one of the elements in pneumatic or hydraulic mechanisms may consist of a metal spring having the shape of a coiled tube of elliptical or oval cross section with walls of equal thickness.

There are also metal springs made in the shape of a coiled tube of elliptical or oval section, with walls of different thickness. The thicker walls of these tubes are located at the ends of the larger axis of the ellipse.

Still another type of metal spring has the form of a coiled oval or round tube with a chamfer running the whole length of the tube along the inner side of the curve, or with the misaligned axes of the outer surface and bore.

A defect of such tubular springs lies in that possessing a considerable rigidity of their own, they fail to develop sufficient retractive force and cannot therefore be used as power elements. In addition, production of these springs is rather complicated.

It is accordingly an object of the invention to provide a power element made of some elastic material, such as rubber in the form of a coiled tube of elongated cross section and with walls of different rigidity, the more rigid wall being located at one of the ends of the smaller axis of symmetry of the cross section.

It has now been ascertained that a device in the form of a multi-coil spiral tube made of rubber or other elastic material with the outer wall more rigid than the inner one, can be used as a power element.

In general, the invention is intended for use in pneumatic and hydraulic mechanisms. In accordance with the preferred embodiment of the invention, it is designed for use in pneumatic or hydraulic instruments requiring large angular displacement under substantial loads.

Therefore, a further object of the invention is the provision of a pneumatic or hydraulic power element possessing an increased angle of turn and developing larger torque.

Another object of the invention is the provision of an easily manufactured tubular coiled spring of elastic material, which can be used as a pneumatic or hydraulic power element.

Figure 1:
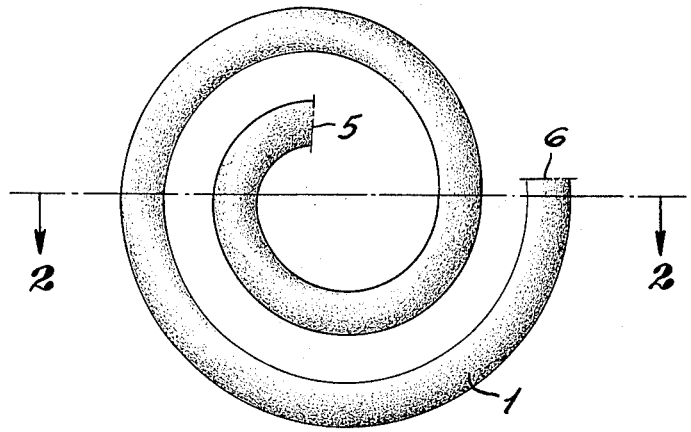
Figure 2:
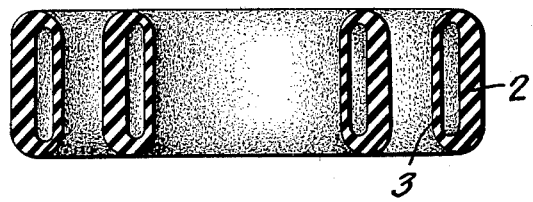
Figure 3:
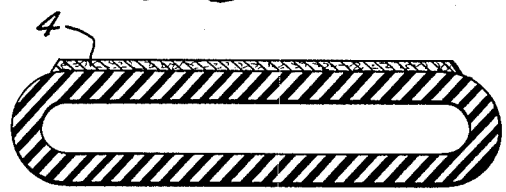

Other objects and advantages of the invention will become obvious from the following detailed description and appended drawings, of which:

FIG. 1 illustrates a spiral multi-coil tube forming the power element; FIG. 2 a section taken on line 2—2 of FIG. 1; and FIG. 3 a cross section of a tube whose wall is reinforced with linen fabric.

The pneumatic or hydraulic power element of this invention comprises a spiral multi-coil tube 1 with a more rigid wall 2 located at one end of the smaller axis of symmetry of the section, the tube 1 being made of some elastic material such as rubber. Rigidity of the wall 2 is increased either by making it thicker than wall 3 or by reinforcing it with a membrane fabric 4, and leaving its thickness unchanged.

The inner end 5 of tube 1 is hermetically sealed while pressure is admitted into the other end 6. Being weaker than wall 2, wall 3 of tube 1 stretches to a greater degree than wall 2. As a result, tube 1 uncoils with the inner end 5 moving only through a substantially arcuate path.

The developed torque can be increased by increasing the width of tube.

This invention can be used as a power element in the pneumatic indicating and recording instruments and other mechanisms.

It should be noted that the invention ensures operation of a coiled tubular spring in the capacity of a power element.

In spite of the fact that this invention is described with reference to the specific embodiment, it is understood that within the scope of the appended claims certain deviations and variants may be made without departing from the spirit of the invention, which is obvious to those competent in this field.

These deviations are considered as not going beyond the essence and scope of the invention and the claims outlined below.

What we claim is:

1. A fluid pressure actuated power element for converting fluid pressure to a torque, said element comprising an elongated tube in the form of a loosely coiled spiral, said tube being formed of a non-rigid highly elastic material, said tube being uniformally elongated in cross section throughout the length thereof and with the inner and outer external surfaces substantially parallel, the outer wall of said tube being reinforced to substantially prevent stretching thereof, said tube being closed at the inner end of said spiral, whereby upon the admission of fluid pressure to said tube the spiral will unwind as a result of stretching of the inner wall of said tube to produce a torque and with the inner end of said tube moving only through a substantially arcuate path.

2. A fluid pressure actuated power element as defined in claim 1 in which said outer wall is reinforced by means of a fabric layer incorporated therein.

3. A fluid pressure actuated power element as defined in claim 1 in which the outer wall of said tube is thicker than the inner wall to reinforce the outer wall.

References Cited by the Examiner

UNITED STATES PATENTS

| | | |
|---|---|---|
| 532,642 | 1/1895 | Crowell. |
| 2,212,128 | 8/1940 | Richter _____ 73—418 X |

FOREIGN PATENTS

| | | |
|---|---|---|
| 6,965 | of 1887 | Great Britain. |
| 882,008 | 7/1953 | Germany. |

ARTHUR L. LA POINT, *Primary Examiner.*